G. MUFFLY
Oct. 18, 1932. EXPANSION CHAMBER FOR REFRIGERATING MECHANISMS Re. 18,633
Original Filed July 18, 1927
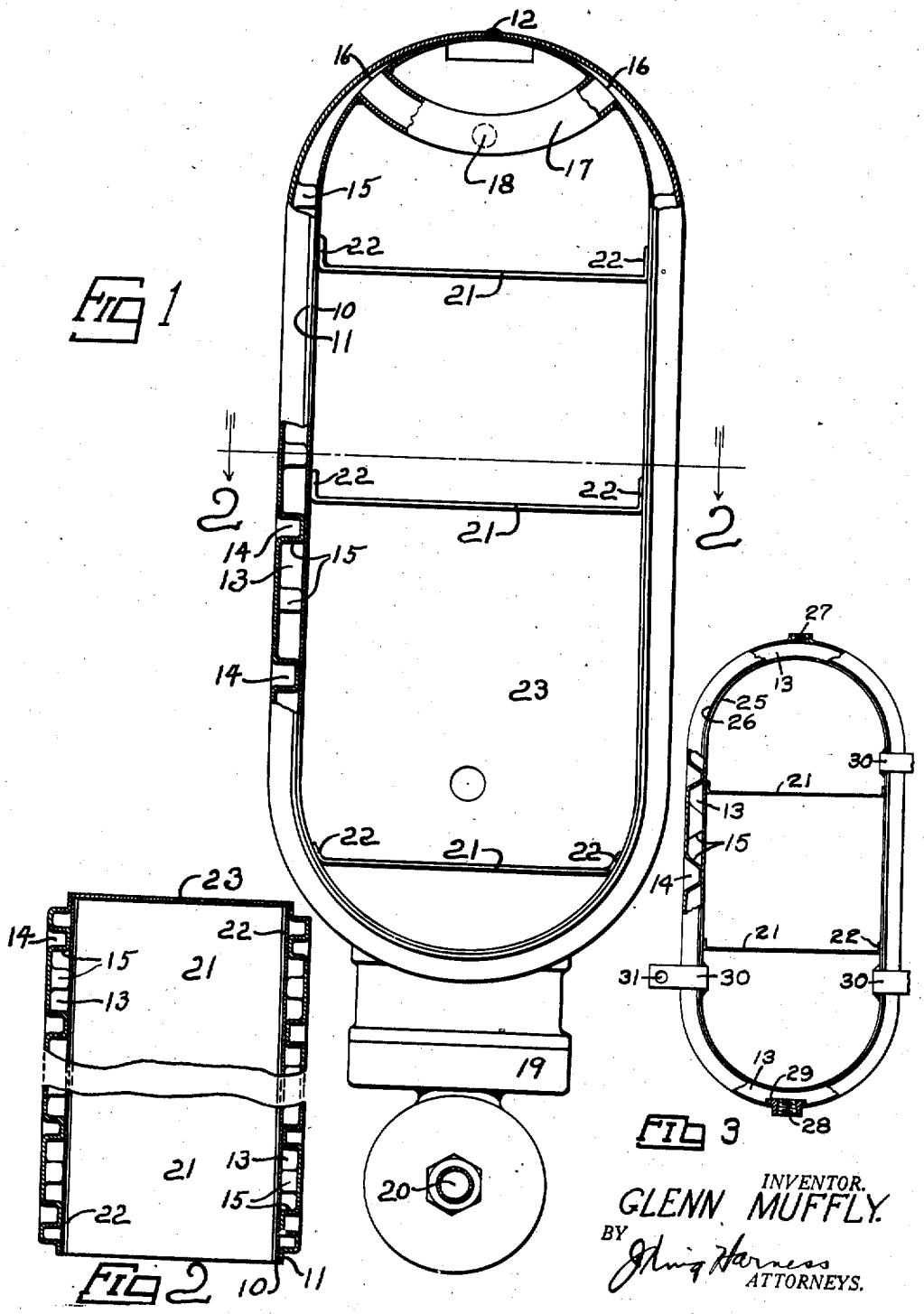
INVENTOR.
GLENN MUFFLY.
BY J. Irving Harness
ATTORNEYS.

Reissued Oct. 18, 1932 Re. 18,633

UNITED STATES PATENT OFFICE

GLENN MUFFLY, OF SCARSDALE, NEW YORK, ASSIGNOR TO COPELAND PRODUCTS, INC., A CORPORATION OF MICHIGAN

EXPANSION CHAMBER FOR REFRIGERATING MECHANISMS

Original No. 1,817,202, dated August 4, 1931, Serial No. 206,438, filed July 18, 1927. Application for reissue filed June 6, 1932. Serial No. 615,738.

This invention relates to expansion chambers for refrigerating mechanism, the principal object being the provision of a new and novel construction for the same wherein the maximum amount of heat transferring surface is provided and a maze is formed within the chamber for the passage of refrigerant passing through the chamber.

Another object is to provide an expansion chamber or cooling element for a refrigerating system, formed from sheet metal into a tubular section, the walls of the tube being formed to provide a passage for refrigerant therethrough and supports being provided between the inner walls of the element for receiving cooling trays.

A further object is to provide an expansion chamber for refrigerating systems, formed from a plurality of metal sheets into a ring-like or tubular section, the walls of which are hollow to provide a passageway for the passage of refrigerant therethrough, depressions being formed in the surface thereof, thereby producing projections within the interior of the hollow walls, which projections provide a maze in the path of the refrigerant passing through such hollow walls.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention,—

Fig. 1 is an end view of an expansion chamber or cooling element for refrigerant mechanisms formed from sheet metal into a generally tubular section in accordance with the present invention, parts of the same being broken away to better illustrate the construction.

Fig. 2 is a sectional view taken on the line 2—2 of Fig. 1.

Fig. 3 is an end view of a modification of the expansion chamber shown in Fig. 1.

Expansion chambers or cooling elements such as the present invention refers to are employed in refrigerating systems for the purpose of absorbing heat from a chamber such as a chamber of a refrigerator. A refrigerant such as butane or sulphur dioxide in the liquid state is fed into the chamber where it is allowed to expand into gas thereby absorbing heat and is then directed through a discharge opening and carried to the intake side of a suitable compressor mechanism. Inasmuch as the heat absorbed by the expanding gases within the expansion chamber is dependent to a certain extent upon the size and shape of the expansion chamber itself, it is desirable to employ an expansion chamber combining a maximum amount of heat transferring surface with minimum size. The present invention contemplates the provision of a construction wherein this result is obtained.

In accordance with the present invention I show in Figs. 1 and 2 a refrigerating element or expansion chamber formed primarily of two sheets of metal 10 and 11. These sheets are formed into a tubular, or for the purpose of illustration, what may be called a generally ring-shaped section, one of the members being telescopically received within the other thereof. The edges of the sheets at the ends of the element are brought into contacting relationship and sealed together preferably by welding or the like, and the remaining edges of the member are brought together, preferably at the top of the expansion chamber, as shown in Fig. 1, in contacting relationship and welded together as at 12, thus forming a continuous ring. The outer sheet 11 between the ends of the expansion chamber and between the remaining edges of sheets 10 and 11 is spaced outwardly from the inner plate 10 so as to provide a chamber 13 between the same and the sheet 10 of maximum dimension in one direction, and minimum dimension in the other direction, thus presenting the maximum amount of heat transferring surface for the refrigerant to absorb heat from the expansion chamber and for the expansion chamber itself to absorb heat from the chamber in which it is situated. In order to increase the effective area of this heat transferring surface, I further provide a plurality of depressions such as 14 in the surface of the outer sheet 11. These depressions 14 form projections 15 within the chamber 13 which extend into contact with the inner plate 10. The ends of the projections 15 are preferably welded to the inner plate 10, thereby imparting to the expansion chamber the ability to withstand a substantial pressure within the same, either positive or negative, without distorting its walls. The depressions 14 are preferably staggered in relation to each other over the entire surface of the outer sheet 10 so as to provide staggered projections 15 within the chamber 13, and these staggered projections 15 form a maze within the chamber 13 through which the refrigerant must flow in its path from the inlet opening to the discharge opening, and cause it to come in contact with a maximum amount of the surface of the expansion chamber with the result that a maximum amount of heat is absorbed from the same.

Openings 16 are provided in the inner sheet 10 adjacent the line of welding 12 at the upper end of the expansion chamber and a pipe member 17 extends between the openings 16 and is suitably secured to the sheet 10 about the same. An opening such as 18 is provided in the pipe member 17 for the discharge of refrigerant through the same to the compressor. An expansion valve of any suitable type such as generally indicated by the numeral 19 in Fig. 1, is secured to the lower face of the expansion chamber and is provided with an opening (not shown) connecting the interior of the expansion valve with the interior of chamber 13. An opening 20 is provided in the expansion valve 19 for the admission of liquid refrigerant into the same.

Sheet metal supports such as 21 are provided between the inner walls of expansion chamber, their flanged ends 22 contacting against the inner plate 10 and being secured thereto by spot-welding or other suitable means. These supporting members 21 provide a support for the usual trays that are used in connection with such refrigerating systems, and at the same time they serve to strengthen the construction of the expansion chamber. If desired, a sheet metal plate such as 23 may be secured across an end face of the expansion chamber in order to close the same, and this is preferable in such constructions particularly when employed in the household size of refrigerating units.

The operation of the above described expansion chamber will be apparent from the above description. The liquid refrigerant enters the opening 20 in the expansion valve 19, and passes through the same into the chamber 13 formed between the sheets 10 and 11, and passes from the lower end of the expansion chamber through the chamber 13 about the projections 15 to the upper portion of the expansion chamber where it passes out through the openings 16 into the pipe member 17 and is exhausted therefrom through the opening 18.

In the modification shown in Fig. 3, the expansion chamber is made of two generally ring-shaped continuous sheet metal members 25 and 26, which are assembled together in telescopic relationship and generally spaced between their edges to form the chamber 13 therebetween. The edges of the members 25 and 26 are secured together and sealed in the same manner as the expansion chamber shown in Fig. 1 and the depressions 14 are provided in the surface of the member 26 to form the interior projections 15 in exactly the same manner as described in connection with Fig. 1. The chamber 13 in this case, instead of being non-continuous as in the construction shown in Fig. 1 is continuous, and extends completely around the expansion chamber between the members 25 and 26. Outlet and inlet openings 27 and 28 are provided in the top and bottom of the expansion chamber for the escape of refrigerant from and the entrance of the refrigerant to the chamber 13. The openings 27 and 28 may be formed previous to the assembly of the part 25 to the part 26 by a punching operation, the metal being flared outwardly about the opening as shown in connection with the opening 27 in Fig. 3 to provide a sleeve which may be threaded for the reception of a suitable connection, or a flanged sleeve member such as 29 provided with a central threaded opening such as shown in connection with the opening 28, may be provided. The tray supports 21 may be secured by their end flanges 22 to the interior walls of the expansion chamber if desired. In the modification shown in Fig. 3 a different form of supporting means is shown. These comprise the strips 30, soldered, welded or otherwise secured to the inner face of the expansion chamber and bent outwardly perpendicular to the same outside of one edge thereof, the outwardly bent portions being provided with openings 31 for the reception of screws, bolts or other securing means.

While I have shown in the accompanying drawing an expansion chamber relatively oval in shape, or, as I have termed it, of generally ring-shaped section, it is to be understood that I do not limit myself to the particular shape shown, but the same may be round, square or of any other tubular section without departing from the present invention, and it is also apparent that the depressions 14 may be formed in the inner sheet 10 of the expansion chamber instead of in the outer sheet 11 or in both sheets 10 and 11 without departing from the present invention.

Formal changes may be made in the specific embodiment of the present invention without departing from the spirit or substance of the broad invention, the scope of which is commensurate with the appended claims.

What I claim is:

1. An expansion chamber for refrigerating systems comprising two superposed sheets of metal having their edges sealed throughout and their faces joined at intervals, said sheets being bent to substantially an O shape and opposed edges secured together, said chamber having a refrigerant inlet in the bottom thereof and a refrigerant outlet in the top thereof.

2. An expansion chamber for refrigerating systems comprising two superimposed sheets of metal having their edges sealed and their faces joined at intervals, said sheets being bent to substantially an O shape, said chamber having a refrigerant inlet in the bottom thereof and a refrigerant outlet in the top thereof, said outlet comprising a pair of openings adjacent the crest of the chamber and a common passage connecting the two.

3. An expansion chamber for refrigerating systems comprising two superposed sheets of metal having their edges sealed together throughout their length and their faces joined at intervals, said sheets being bent to substantially an O shape, bent intermediate their ends to provide a valley portion and a pair of parallel side portions, and a continuous top portion including opposed edges of said sheets, a refrigerant inlet in the valley portion and a refrigerant outlet for the side portions.

4. An expansion chamber for refrigerating systems comprising two superimposed sheets of metal having their edges sealed and their faces joined at intervals, said sheets being bent to substantially an O shape, bent intermediate their ends to provide a valley portion and a pair of parallel side pinions, a refrigerant inlet in the valley portion and a refrigerant outlet for the side portions, said outlet comprising an opening in each of the sides adjacent the top thereof and a common passage connecting the same to an outlet pipe.

5. A cooling element for refrigerating systems comprising a pair of generally ring-like sheets of metal, one socketed within the other in generally spaced relation thereto and sealed throughout their edges to form a chamber therebetween, said sheets contacting the full length of the top of said element, a passageway connecting the sides of said element adjacent the top thereof, an opening in said passageway for exhausting said element, inlet means for refrigerant adjacent the bottom of said element, and a plurality of depressions in the outer face of the outer of said sheets forming projections within said chamber providing a maze for the passage of said refrigerant from said inlet means to said opening.

6. A chamber for use in connection with refrigerator systems comprising a pair of continuous sheet metal members one received within the other in generally spaced relation thereto except at the top thereof to form a chamber between the same and joined together throughout their edges, a plurality of spaced depressions in the outer surface of one of said members forming projections within said chamber, an outlet opening at the top of said chamber, and an inlet opening at the bottom of said chamber.

7. A chamber for use in connection with refrigerator systems comprising a pair of ring-like sheet metal members one of which is telescopically received within the other, the edges of said members contacting against each other and sealed against leakage, said members being completely separated from each other between said edges except at a plurality of spaced points where the bottoms of projections formed on at least one of said members contact against the other of said members and are secured thereto, and except at the top of said members where they lie in complete contact with each other over the length of said chambers, and inlet and outlet openings leading into and out of the space between said members.

8. An expansion chamber for refrigerating systems comprising a pair of metal sheets joined together throughout their edges and being generally spaced between their edges, said joined sheets being bent to bring two opposed edges thereof into contact with each other whereby to form a tubular structure, and an inlet and an outlet for the space between said sheets.

9. An expansion chamber for refrigerating systems comprising a tubular member having generally hollow walls formed from inner and outer sheets of metal directly contacting along their margins and there sealed together, said sheets being joined in line contact over the length of said chamber adjacent the top thereof, and an inlet and an outlet for said hollow walls at the top and bottom respectively, of said chamber.

10. The method of making a refrigerant expansion element which comprises welding together the edges of two sheets of metal to form the ends of a chamber for the expansion of refrigerant liquid, welding said sheets together at intervals intermediate such edges for reinforcing said sheets against the pressure of said refrigerant employed, bending intermediate portions of said sheets to bring the remaining edges thereof together to provide an enclosure suitable for the reception of ice trays internally thereof and for cooling the interior of a refrigerator exteriorly thereof, and welding together the meeting edges of said sheet to complete the continuous formation of said element.

11. A refrigerant expansion element for use in connection with refrigerating systems comprising a pair of sheet metal members one received within the other in generally spaced relation with the edges thereof welded together to provide a chamber for refrigerant, said sheets also being welded together intermediate the edges at spaced intervals to secure the sheets against separation under the pressure of said refrigerant, said members having the opposite ends thereof terminating against one another to provide an enclosure for the reception of ice trays therein, an inlet for the chamber between said sheets for supplying said refrigerant thereto, and a conduit communicating with said chamber between the opposite but adjacent ends of said members for exhausting said refrigerant simultaneously from the opposite ends of said chamber.

12. A refrigerant expansion element comprising a pair of sheet metal members having the opposite edges thereof welded together to provide continuous sheet metal shells, said shells being disposed in spaced relation, one within the other and welded together at the ends of the element to provide a refrigerant expansion chamber, said element being provided with parallel side portions joined at one end by a connecting portion, said sheet metal members in the regions of said side portions being welded together across said chamber for reinforcing the element against fluid pressure affecting such regions and said sheet metal members in the region of said connecting portion being continuously curved between opposite sides of said element for reinforcing the element against fluid pressure affecting such region.

13. A refrigerant expansion element comprising a pair of sheet metal members having the opposite edges thereof welded together to provide continuous sheet metal shells, said shells being disposed in spaced relation, one within the other and welded together at the ends of the element to provide a refrigerant expansion chamber, said element being provided with parallel side portions joined at one end by a connecting portion, said sheet metal members in the regions of said side portions being welded together across said chamber for reinforcing the element against fluid pressure affecting such regions and said sheet metal members in the region of said connecting portion being continuously curved between opposite sides of said element for reinforcing the element against fluid pressure affecting such region, said weld between the opposite ends of one of said sheet metal members being within the limits of said connecting portion.

GLENN MUFFLY.